(12) United States Patent
Qian (10) Patent No.: US 7,433,329 B2
(45) Date of Patent: Oct. 7, 2008

(54) AGGREGATION SCHEDULER (75) Inventor: Lu Qian, Solon, OH (US)

(73) Assignee: Cisco Technology, Inc.

( * ) Notice: Subject to any disclaimer, the term of this patent is extended or adjusted under 35 U.S.C. 154(b) by 293 days.

(21) Appl. No.: 11/189,385

(22) Filed: Jul. 26, 2005

(65) Prior Publication Data

US 2005/0254459 A1  Nov. 17, 2005

Related U.S. Application Data

(63) Continuation-in-part of application No. 11/032,747, filed on Jan. 11, 2005, and a continuation-in-part of application No. 10/840,878, filed on May 7, 2004.

(60) Provisional application No. 60/616,306, filed on Oct. 6, 2004, provisional application No. 60/560,303, filed on Apr. 7, 2004.

(51) Int. Cl.
*H04B 7/00* (2006.01)
*H04B 1/38* (2006.01)
*H04B 1/16* (2006.01)
*G08C 17/00* (2006.01)
*H04J 1/16* (2006.01)
*H04J 3/14* (2006.01)
*H04M 1/00* (2006.01)

(52) U.S. Cl. .................. 370/310; 370/229; 370/311; 455/343.1; 455/574

(58) Field of Classification Search ............ 370/311, 370/229; 455/572, 574, 343.1–343.5
See application file for complete search history.

(56) References Cited

U.S. PATENT DOCUMENTS

| | | | | |
|---|---|---|---|---|
| 6,917,598 | B1 * | 7/2005 | Emeott et al. | 370/311 |
| 7,120,852 | B2 * | 10/2006 | Terry et al. | 714/776 |
| 7,245,946 | B2 * | 7/2007 | Liu | 455/574 |
| 2003/0152058 | A1 * | 8/2003 | Cimini et al. | 370/338 |
| 2003/0169769 | A1 * | 9/2003 | Ho et al. | 370/473 |
| 2003/0223365 | A1 * | 12/2003 | Kowalski | 370/230.1 |
| 2005/0122960 | A1 * | 6/2005 | Khan | 370/352 |
| 2005/0135318 | A1 * | 6/2005 | Walton et al. | 370/338 |
| 2005/0138451 | A1 * | 6/2005 | Simpson et al. | 713/320 |

(Continued)

OTHER PUBLICATIONS

Chesson, Run VoIP through your wireless LAN, EETimes Japan, May 31, 2005, http://www.commsdesign.com/printableArticle/?articleID=163702175.

*Primary Examiner*—Lester Kincaid
*Assistant Examiner*—Nathan Mitchell
(74) *Attorney, Agent, or Firm*—Tucker Ellis & West LLP (57) ABSTRACT

An aggregation scheduler that determines which frames are to be aggregated in an aggregate at a specific time, and allocates a time and duration for each responder of the aggregate. The AP maintains information for each of its clients, including whether the client is in an awake or doze state and the time stamp arrival (TSA) for each frame received from the client by the AP. When an AP obtains channel access, it only aggregates frames for those clients that are awake. From the TSA and the voice packet arrival interval for the client, the AP can compute how many voice frames are waiting at the client since the AP received the last frame from the client. Knowing the number of voice frames waiting at the voice client and the transmission rate, enables the AP to accurately ascertain the response time and duration for the voice client.

21 Claims, 5 Drawing Sheets

U.S. PATENT DOCUMENTS

2005/0152324 A1* 7/2005 Benveniste .................. 370/338
2005/0152358 A1* 7/2005 Giesberts et al. ............ 370/389
2005/0220145 A1* 10/2005 Nishibayashi et al. ....... 370/474

* cited by examiner n=3, 4n frame exchanges, 2n channel access contentions

FIGURE 1 (Prior Art)

n=3, 3n+1 frame exchanges, n+1 channel access contentions

AGGREGATION SCHEDULER

CROSS-REFERENCE TO RELATED APPLICATIONS

This application is a continuation-in-part of U.S. application Ser. No. 11/032,747 filed Jan. 11, 2005, which claims the benefit of priority of U.S. Provisional Application No. 60/616,306 filed Oct. 6, 2004, and is a continuation-in-part of U.S. application Ser. No. 10/840,878, filed on May 7, 2004, which claims the benefit of priority of U.S. Provisional Application No. 60/560,303 filed Apr. 7, 2004, the contents of which are hereby incorporated by reference.

BACKGROUND OF THE INVENTION

For many wireless network applications, such as a WVoIP (Wireless Voice over Internet Protocol) system, power saving (PS) of voice clients and quality of Service (QoS) are major concerns. Power savings is a concern because wireless clients are usually battery powered; the more power that is saved, the longer the batteries in the client last. For example, UPSD (Unscheduled Power Save Delivery) in IEEE 802.11e specification provides great power savings. Simulations have shown that UPSD can put a voice client in doze for more than 90% of time during an active talking session.

VoIP is a constant-bit rate application. VoIP packets or frames are continually generated at a constant interval, usually 10, 20 or 30 ms. Therefore, either the HCCA (Hybrid Controlled Channel Access) or the EDCA (Enhanced Distributed Channel Access) extension can be used to synchronize transfers between an AP and a station.

Using HCCA polling, once a station is accepted by an AP as a polled client, the station sleeps until the expected arrival time for a downlink poll, or poll plus VoIP frame. The station responds within a mandatory time with uplink VoIP data (or with a QoS NULL) frame. A problem with HCCA is that the poll can be delayed by many factors including but not limited to interference, a long duration frame, a scheduling conflict wherein the AP is polling another station, a previous frame exchange taking longer than expected, relative clock drift between the AP and the client, or the AP transmitting multiple downlink frames instead of the usual single frame.

The EDCA access method provides for prioritized channel access. Unlike HCCA wherein the station is constrained by the AP polling schedule, the EDCA client may operate in unscheduled automatic power save delivery (U-APSD). In this mode, the station sleeps until it has a VoIP frame ready to transmit. The AP is expecting the transmission because of prior signals exchanged between the client and the AP.

EDCA and HCCA assume the AP is configured to avoid long bursts or other behavior which may cause delays in access. Otherwise, either scheme will experience a scheduling time shift or a delay in the UPSD frame exchange.

Figure 1:
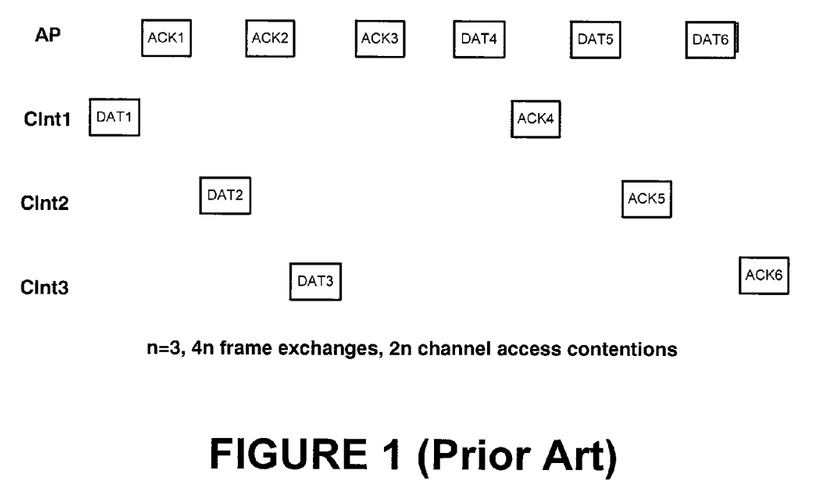
FIG. 1 is a graphical illustration of packets exchanged with unscheduled automatic power save delivery.

FIG. 1 provides a graphical illustration of packet exchanges for a system implementing UPSD. The example of FIG. 1 has one AP and three clients (Clnt1, Clnt2 and Clnt3). As shown in FIG. 1, the first client, CLNT1, sends a frame, DAT1 when it wakes up, and the AP responds with an ACK (ACK1). The second client, CLNT2, then sends a frame, DAT2 and the AP responds with a subsequent ACK (ACK2). The third client, CLNT3, wakes up and sends a frame, DAT3 and the AP responds with a subsequent ACK (ACK3). The AP also sends downlink frames DAT4, DAT5, DAT6 separately to each client, CLNT1, CLNT2, CLNT3 respectively. Each client then responds to the data frames with corresponding ACKs (ACK4, ACK5 and ACK6). For the illustration in FIG. 1, there are 3 (n=3) stations, resulting in 12 frame exchanges and 6 channel access contentions. Thus, for UPSD, for a number of stations (n), there are 4n frame exchanges and 2n channel access contentions Frame aggregation is a fundamental technology to achieve the high throughput (HT) requirement for the next generation of wireless network, covered by IEEE 802.11 TGn (Task Group n) specification. Cisco's (Cisco System, Inc., 170 West Tasman, San Jose, Calif.) contributions of MRMRA (the multi-receiver multi-response aggregation) and MRM-RMRA (the multi-rate multi-receiver multi-response aggregation) to the 802.11n proposals provide a practical means to substantially improve the MAC efficiency of the network while still well maintaining the QoS (Quality of Service) by minimizing frame latencies. They are especially efficient for wireless voice over IP (WVoIP). MRMRA and MRMRMRA specify the protocols, namely the frame exchange sequences and frame formats, for multi-receiver multi-response aggregations of single rate or multi-rates. To utilize the protocols, an aggregation scheduler decides what frames to be aggregated in an aggregation at a specific time and what duration values to allocate for each of the multiple receivers.

However, as noted hereinabove, an assumption for EDCA and HCCA access is that the AP is configured to avoid long bursts or other behavior which may cause delays in access. Thus, the need exists for a system and method which allow UPSD and MRMRA to co-exist.

BRIEF SUMMARY OF THE INVENTION

In accordance with an aspect of the present invention, there is disclosed herein an aggregation scheduler that resides on the access point (AP). The scheduler determines which frames are to be aggregated in an aggregate at a specific time, and can compute the time and duration of the response for each of the responders of the aggregate. The scheduler is capable of being implemented in firmware, hardware, software or any combination thereof.

An AP keeps the following information for each of its clients, 1) whether the client is in an awake or doze state; and 2) the time stamp arrival (TSA) for each frame received from the client by the AP. When an AP obtains channel access, it only aggregates frames for those clients that are in an awake state. From the TSA and the voice packet arrival interval for the client, the AP can compute how many voice frames are waiting at the client since the AP received the last frame from the client. Knowing the number of voice frames waiting at the voice client and the transmission rate, enables the AP to accurately ascertain the response duration for the voice client.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. In accordance with an aspect of the present invention there is described herein an aggregation scheduler that resides on the access point (AP). The scheduler determines what frames are to be aggregated in an aggregate at a specific time and to determine the time and duration to be allocated for each responder of an aggregate. The AP maintains information for each client, such as a voice client, including but not limited to whether the client is in an awake state or in a doze (power save) state, and the TSA of the last frame received from the client. The TSA can be the time when the AP received the frame, or derived from the frame itself, e.g., the time field of the RTP header of a voice frame.

When an AP obtains channel access, for example using EDCA or HCCA, it aggregates voice frames for those clients in an awake state. Based on the TSA the AP keeps for each client and the packet arrival interval for the client, the AP can compute how many frames are waiting at a client since the AP received the last frame from the client. For example, if 30 ms has elapsed from the TSA and the time to transmit the aggregate and the voice frame arrival is 20 ms, the AP ascertains there should be one frame waiting in the client. By knowing the number of frames waiting in a client and the transmission rate, the AP can accurately determine the response duration for the client. Therefore, the AP can schedule the time for the client to respond and know the duration for the client to respond. This prevents over allocation, which wastes channel utilization, and/or under allocation, which would disallow for an aggregated uplink ACK and frame.

Figure 2:
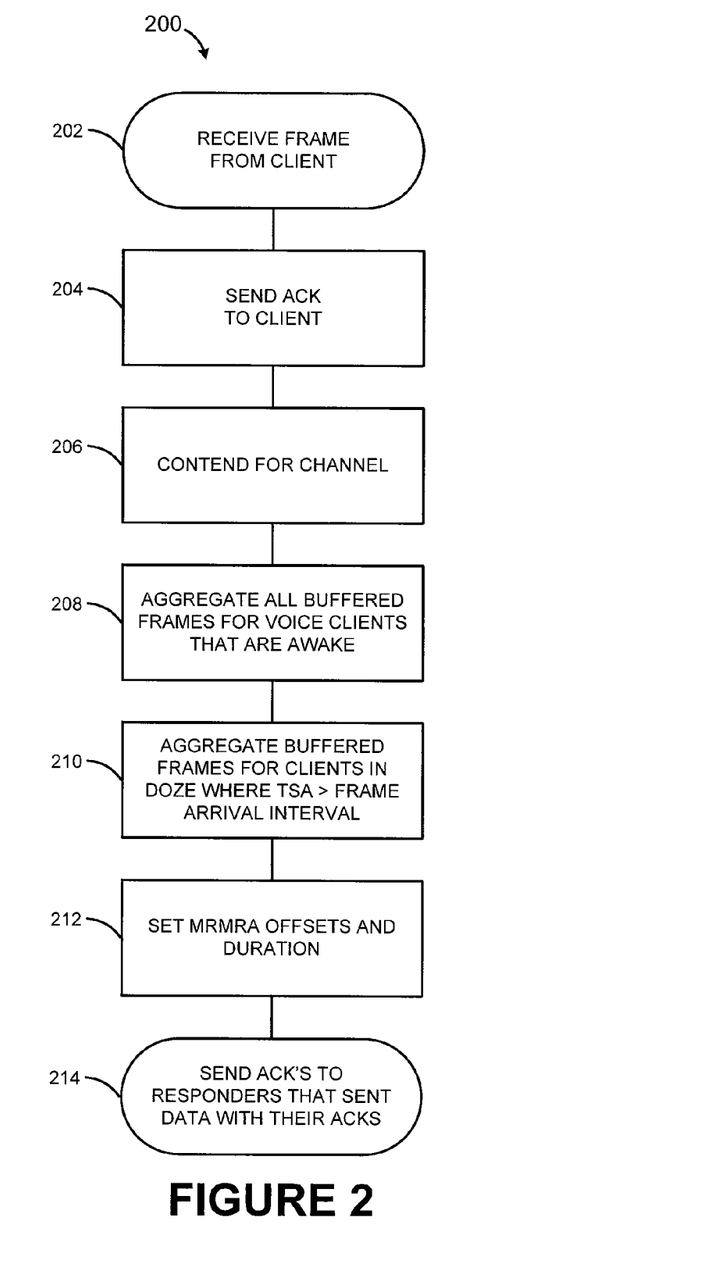
FIG. 2 is a block diagram of a method for an access point to schedule an aggregate with clients implementing unscheduled automatic power save delivery.
Figure 3:
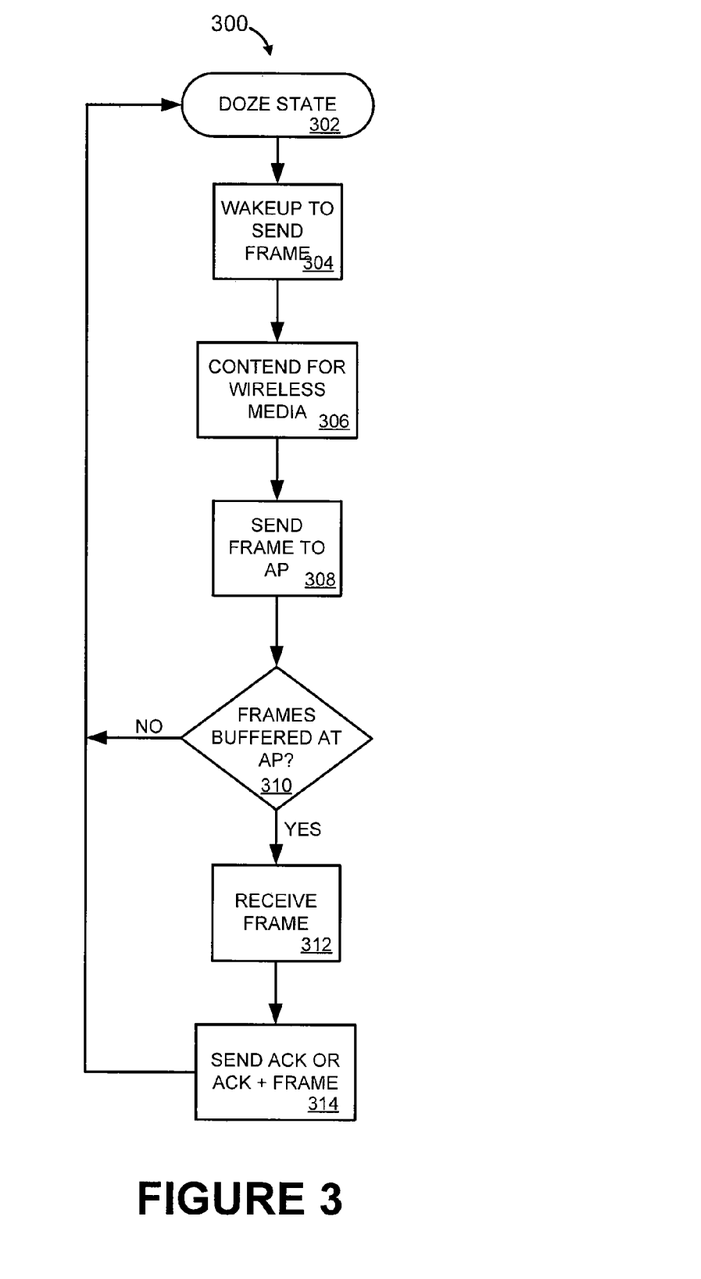
FIG. 3 is a block diagram of a method for a client implementing unscheduled automatic power save delivery.

Methodologies in accordance with various aspects of the present invention will be better appreciated with reference to FIGS. 2 and 3. While for purposes of simplicity of explanation the methodologies of FIGS. 2 and 3 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodologies in hardware, software, or a combination thereof.

FIG. 2 is a block diagram of a method 200 for an access point to schedule an aggregate with clients implementing unscheduled automatic power save delivery. At 202 the AP receives a frame from a client. If the current status for the client is in the doze state, the AP changes the status for the client to an awake state. At 204 the AP sends an ACK (acknowledgement) to the client. The AP would wait a SIFS (short inter frame space) or other appropriate time period for the channel to be clear before sending the ACK. The ACK is set to indicate to the whether the AP has any frames buffered for the client.

At 206, the AP contends for the channel. For USPD stations, the AP uses the appropriate method for contending for the channel, such as HCCA or EDCA.

At 208, the AP aggregates all buffered frames for clients that are awake and creates an aggregate frame, e.g., an MRMRA or MRMRMRA frame for the clients that are awake. Because the AP maintains the status of each client, the AP can determine which clients are awake.

At 210, the AP also aggregates buffered frames for clients that are in the doze state, but the time elapsed since the TSA of the last frame received is greater than frame arrival interval for the client. The frame arrival interval is the time interval for the client to generate a packet or frame. When the client associates to the AP the AP learns the frame arrival interval for the client. Because the elapsed time since the TSA of the last frame is greater than the frame arrival interval, it is determined that the client is in an awake state, even if the client has not yet sent a frame to the AP.

For example, for a voice client, VoIP packets or frames are continually generated at a constant interval, for example 10, 20 or 30 ms. If a VoIP client has voice frame arrival interval of 10 ms and the time elapsed from the TSA of the last frame received from the client is 11 ms, the AP can determine that the voice client has one frame (uplink frame) waiting to be sent. Similarly, if 21 ms have elapsed since the last frame was received from the voice client, the AP determines there are two frames waiting to be sent. Although method 200 shows that the aggregate is formed using both steps 206 and 208, it should be readily appreciated that both steps are not required for an aggregate. For example, the aggregate may contain only frames for stations the AP knows are awake, or only frames where the time elapsed from the TSA for the last frame received from the client is greater than the frame arrival interval.

At 212, the AP sets the MRMRA offsets and duration for each of the multi-responders of the aggregate. The AP determines for each responder whether the responder has a frame waiting to be sent by ascertaining whether the time elapsed from the TSA for each responder is greater than the frame arrival interval for the responder. The AP then sets the duration for each responder long enough for an ACK, and for any responder where the time elapsed from the last TSA is greater than the frame arrival interval, the AP sets the duration long enough for that responder to send buffered frames with the ACK. This technique ensures that the duration values are very accurate.

At 214, the packet is sent and the AP waits for responders to ACK. The AP also sends an ACK to each responder that sent data attached to the ACK to the aggregate.

FIG. 3 is a block diagram of a method 300 for a client implementing unscheduled automatic power save delivery. At 302, the client is in a doze state. A client is in a doze state when it has no frame to send. At 304, the client wakes up from the doze state when it has a frame to send. At 306, the client then contends for is the wireless medium. A voice client may contend for the wireless medium using either EDCA or HCCA. After the voice client obtains contention for the wireless medium, at 308 the client sends a frame to the AP. The client expects to receive an ACK from the AP after a SIFS time. The client shall retry a transmission if it fails to receive an ACK after SIFS of time.

AT 310, the client then determines if there are any frames for it buffered on the AP, indicated in the ACK received from the AP at 308. If at 310 it is determined that there are no frames buffered for the client (NO), then at 302 the client returns to the doze state.

If at 310 it is determined that there is a frame buffered for it at the AP (YES), at 312 stays awake until it received a frame or an ACK from the AP indicating there are no frames for it buffered at the AP. The client then sends an ACK a SIFS time after it receives a frame from the AP (unless the frame is an aggregate, in which case the client responds at the assigned time) at 314. If the client has uplink frames to send to the AP, it can attach the frames to the ACK. The client also indicates in the ACK if there are any more uplink frames waiting to be sent to the AP.

Figure 4:
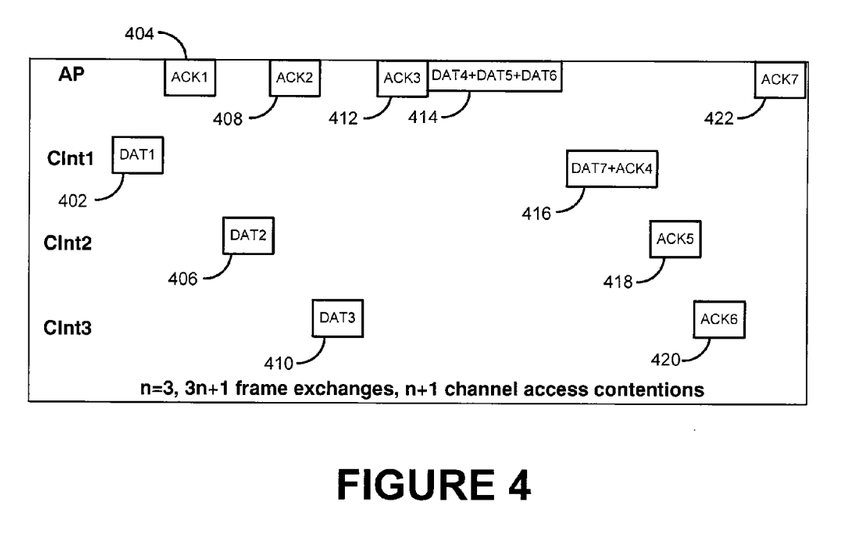
FIG. 4 is a graphical illustration of packets exchanged using while implementing multi-receiver multi-response aggregation with unscheduled automatic power save delivery.

FIG. 4 is a graphical illustration of packets exchanged using while implementing multi-receiver multi-response aggregation with unscheduled automatic power save delivery. The example of FIG. 4, similar to the example of FIG. 1 shows packet exchanges between an AP and three clients, Clnt1, Clnt2, Clnt3.

Clnt1 wakes up from a doze state and sends DAT1 as illustrated by frame 402. The AP responds with ACK1 404. Clnt2 wakes up from a doze state and sends frame DAT2 as illustrated by 406, and the AP responds with ACK2 408. Clnt3 wakes up from a doze state and sends frame DAT3 410. At this point in time, the AP knows that clients Clnt1, Clnt2, Clnt3 are in an awake state. Therefore, the AP can send an aggregate frame 414 to Clnt3, Clnt2 and Clnt3. Aggregate frame 414 is sent with ACK3 412, the ACK for DAT3 410 sent by Clnt3.

Using techniques described herein supra, AP can determine if either Clnt1, Clnt2 and/or Clnt3 have an uplink frame to sends. As was explained previously, the AP can determine from the frame arrival interval and an amount of time since a last uplink whether a client has an uplink frame. The AP can then schedule the response time and the duration of the response accordingly (similar to an 802.11 transmission opportunity—TXOP). Clnt1 then sends an ACK for aggregate 414 along with an uplink frame DAT 7 (i.e., Clnt1 sends DAT7+ACK4) as shown by frame 416. Clnt2 then sends ACK5 418 in response to aggregate 414 at the appropriate time, and Clnt3 sends ACK6 420 in response to aggregate 414 at the appropriate time. Because Clnt1 sent DAT7 along with ACK4 at 416, the AP sends ACK7 422 in response to receiving the frame from Clnt1.

Figure 5:
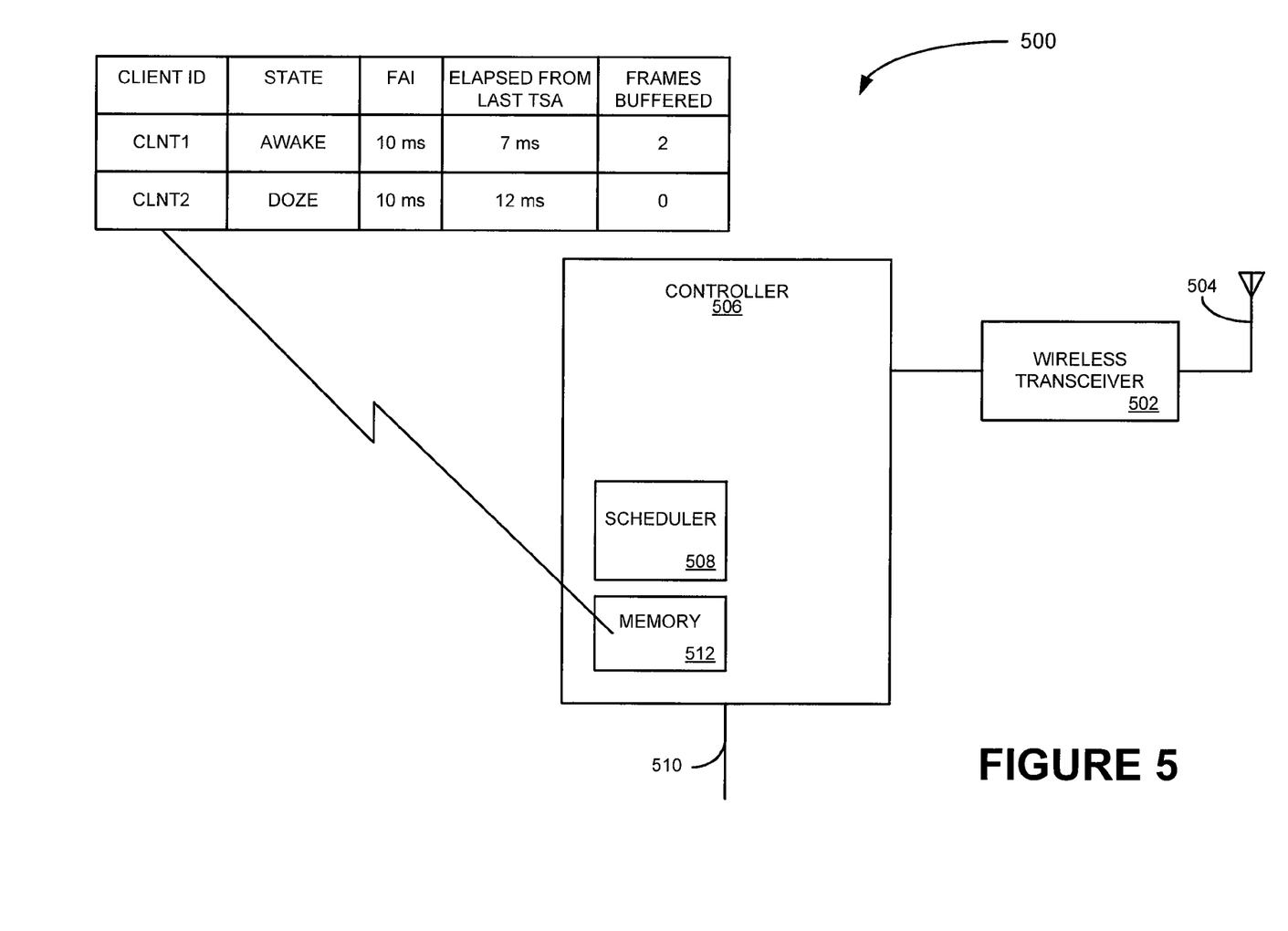
FIG. 5 is a block diagram of an access point with a scheduler for multi-receiver multi-response aggregation to implement multi-receiver multi-response aggregation with unscheduled automatic power save delivery.

As can be observed from FIG. 4, for 3 clients, there are 10 frame exchanges and 4 channel access contentions (because the aggregate schedules the responses to the aggregate). Or for n clients, the exchange has 3n+1 frame exchanges and n+1 channel access contentions, which is a significant enhancement to channel efficiency compared to the frame exchange sequence illustrated in FIG. 1. FIG. 5 is a block diagram of an access point (AP) 500 with a scheduler for multi-receiver multi-response aggregation to implement multi-receiver multi-response aggregation with unscheduled automatic power save delivery. AP 500 comprises a wireless transceiver 502 for sending and/or receiving wireless signals from antenna 504. Transceiver 502 suitably comprises circuits for converting the signal, including but not limited to digital to analog (D/A), analog to digital (A/D), modulation/demodulation and/or upconverting/downconverting between baseband signals and the transmission frequency. A controller 506 is coupled to transceiver 502 for controlling operation of the wireless transceiver. Controller 506 suitably comprises logic to control the operation of wireless transceiver 502 and to implement one or more aspects of the present invention as described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In operation, when AP 500 receives a wireless signal, it is received via antenna 504 and converted to a baseband signal by wireless transceiver 502. Logic in controller 506 then determines how to process the signal. For example, if an ACK is required, logic in controller 506 sends appropriate signals to wireless transceiver 502 to send the ACK via wireless antenna 504. If the wireless signal is destined to the local area network, controller 506 routes the signal through network connection 510 to the network. Network connection is suitably any wired or wireless network communication topology, such as Ethernet, or a Mesh Network.

Scheduler 508 is coupled to controller 506 and configured implement one or more aspects of the present invention. Memory 512, which can be one or more memory devices, is coupled to scheduler 506 and is used by scheduler for buffering frames and maintaining the status of clients connected to AP 500. For example, scheduler 508 can utilize memory 512 to maintain for each client the state (awake or doze), the frame arrival interval (FAI), the time stamp arrival (TSA) or the elapsed time since the last TSA, and whether there are any frames currently buffered for the client. Scheduler 508 can determine a client is awake when AP 500 receives a frame from the client. However, scheduler 508 can also determine when a client should be changing from the doze state to the awake state by comparing the frame arrival interval with the elapsed time since the last frame was received by AP 500. As illustrated in FIG. 5, scheduler 508 and memory 512 are located within controller 506. However, this is merely illustrative, as scheduler 508 and memory 512 may suitably be located external to controller 506.

Logic in scheduler 506 can determine which stations from a plurality of stations utilizing unscheduled power save delivery are in an awake state. For example, when AP 500 receives a frame from the client, scheduler 508 knows the client is awake. Scheduler 508 is then suitably configured to create an aggregate to frame (not shown), the aggregate frame comprising at least one frame for each of the plurality of stations in the awake state. Controller 506 is responsive to scheduler 508 creating the aggregate frame to send the aggregate frame to wireless transceiver 502 for transmission via antenna 504.

Scheduler 508 can be configured to automatically derive a wakeup schedule for the plurality of stations based on a predetermined interval for each station. For example, by knowing the frame arrival interval and the elapsed time since the last frame was received from a client, scheduler 508 can determine if the client is in an awake state, even if the client has not yet sent a frame to AP 500. For example, if the elapsed time is greater than the frame arrival interval, then scheduler 506 determines that the client is in an awake state. Furthermore, scheduler 508 can also determine how many frames the client may need to uplink. For example, if the frame arrival interval for a client is 10 ms, then for every 10 ms that has elapsed from the TSA of the last frame received by AP 500 from the client, a frame is waiting to be uplinked.

By knowing which clients are awake and how many frames each client has to send to AP 500, scheduler 508 can schedule a response time with the appropriate duration to receive the buffered uplink frames from the client. The time allocated for the response for every station is based on a calculation of number of uplink frames waiting to be sent. The calculation of number of uplink frames waiting to be sent is based on a frame arrival interval and an amount of time since a last uplink frame was received from the client. Alternatively, scheduler 508 can be configured to wait until receiving a packet from every one of the plurality of stations in the awake state before sending the aggregate frame.

Figure 6:
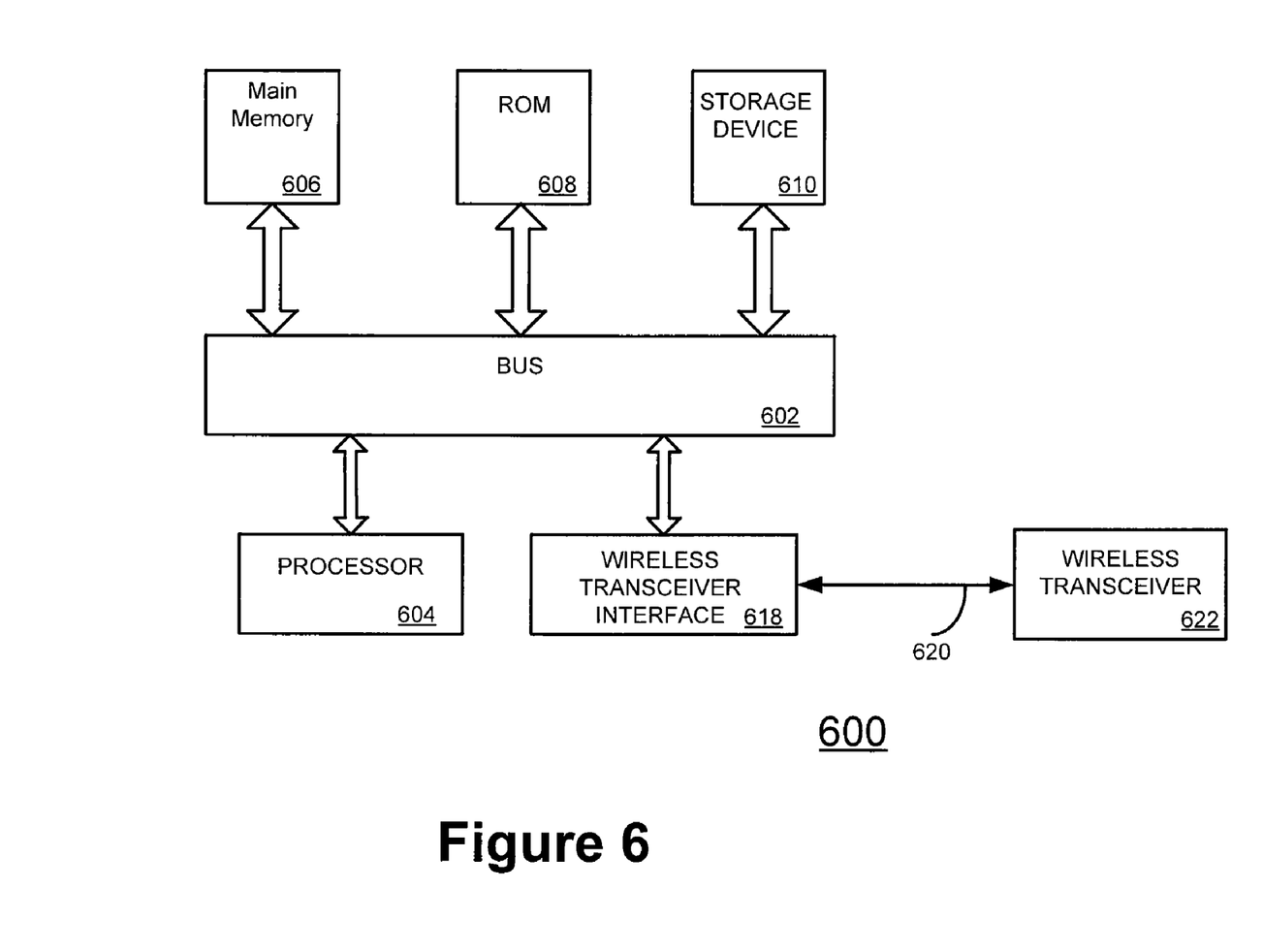
FIG. 6 is a block diagram that illustrates a computer system upon which a scheduler for multi-receiver multi-response aggregation to implement multi-receiver multi-response aggregation with unscheduled automatic power save delivery may be implemented.

FIG. 6 is a block diagram that illustrates a computer system 600 upon which an embodiment of the invention may be implemented. Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 108 or other static storage device coupled to bus 602 for storing static information and instructions for processor 604. A storage device 610, such as a magnetic disk or optical disk, is provided and coupled to bus 102 for storing information and instructions.

The invention is related to the use of computer system 600 for an aggregation scheduler. According to one embodiment of the invention, an aggregation scheduler is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to non-volatile media and volatile media. Non-volatile media include for example optical or magnetic disks, such as storage device 610. Volatile media include dynamic memory such as main memory 606. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The instruction may then be loaded into main memory 606. The instructions received by main memory 606 may optionally be stored on storage device 610 either before or after execution by processor 604.

Computer system 600 also includes a wireless transceiver interface 618 coupled to bus 602. Wireless transceiver interface 618 provides a two-way data communication coupling via a bi-directional interface 620 that is connected to a wireless transceiver 622. For example, communication interface 618 may be a bus, an integrated services digital network (ISDN) card or a modem to provide a data communication connection to wireless transceiver 622. As another example, bi-directional link 618 may be a local area network (LAN) card to provide a data communication connection to a compatible LAN. Wireless links may also be implemented. In any such implementation, wireless transceiver interface 618 sends and receives electrical, electromagnetic, or optical signals that carry digital data streams representing various types of information.

An aspect of the aggregation scheduler as disclosed herein is that it can decrease the load on a channel. The scheduler is capable of reducing by 50% the number of contentions for the wireless medium and reducing by at least 25% the number of frame exchanges using MRMRA rules while retaining the power saving benefits of UPSD.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An aggregation scheduling method, comprising:
    determining a plurality of stations utilizing unscheduled power save delivery are in an awake state;
    sending an aggregate frame, the aggregate frame comprising at least one frame for each of the plurality of stations in the awake state;
    scheduling a response time for every station determined to be in the awake state, the scheduled response including a time when to respond and a duration of time allocated for the response;
    wherein the time allocated for the response for every station is based on a calculation of number of uplink frames waiting to be sent; and
    wherein the calculation of number of uplink frames waiting to be sent is based a frame arrival interval and an amount of time since a last uplink frame was received.

2. A method according to claim 1, the determining comprises automatically deriving a wakeup schedule for the plurality of stations based on a predetermined interval for each station.

3. A method according to claim 2, wherein the predetermined interval for each station is an interval from when a last frame was received from the station.

4. A method according to claim 1, wherein the determining comprises receiving a frame from at least one station in the awake state.

5. An access point, comprising:
- a wireless transceiver;
- a controller coupled to the wireless transceiver for controlling the operation thereof;
- a scheduler coupled to the controller configured to determine a plurality of stations utilizing unscheduled power save delivery are in an awake state, and to create an aggregate frame, the aggregate frame comprising at least one frame for each of the plurality of stations in the awake state;
- wherein the controller is responsive to the scheduler creating the aggregate frame to send the aggregate frame to the wireless transceiver for transmission;
- wherein the scheduler is further configured to schedule a response time for every station determined to be in the awake state, the scheduled response including a time when to respond and a duration of time allocated for the response;
- wherein the time allocated for the response for every station is based on a calculation of number of uplink frames waiting to be sent; and
- wherein the calculation of number of uplink frames waiting to be sent is based a frame arrival interval and an amount of time since a last uplink frame was received.

6. An access point according to claim 5, wherein the scheduler is configured to automatically deriving a wakeup schedule for the plurality of stations based on a predetermined interval for each station.

7. An access point according to claim 6, wherein the predetermined interval for each station is an interval from when a last frame was received from the station.

8. An access point according to claim 5, wherein the scheduler determines at least one station is in the awake state after receiving a frame from the at least one station.

9. A computer program product having a computer readable medium having computer program logic recorded thereon for implementing an aggregation scheduler, comprising:
- means for determining a plurality of stations utilizing unscheduled power save delivery are in an awake state; and
- means for sending an aggregate frame, the aggregate frame comprising at least one frame for each of the plurality of stations in the awake state, wherein the means for sending an aggregate frame comprises means for scheduling a response time for every station determined to be in the awake state, the scheduled response including a time when to respond and a duration of time allocated for the response;
- wherein the time allocated for the response for every station is based on a calculation of number of uplink frames waiting to be sent; and
- wherein the calculation of number of uplink frames waiting to be sent is based a frame arrival interval and an amount of time since a last uplink frame was received.

10. A computer program product according to claim 9, the means for determining comprises means for automatically deriving a wakeup schedule for the plurality of stations based on a predetermined interval for each station.

11. A computer program product according to claim 10, wherein the predetermined interval for each station is an interval from when a last frame was received from the station.

12. A computer program product according to claim 9, wherein the means for determining comprises means for receiving a frame from at least one station in the awake state.

13. A computer program product according to claim 9, further comprising means for waiting until receiving a packet from every one of the plurality of stations in the awake state before sending the aggregate frame.

14. An aggregation scheduling method, comprising:
- determining a plurality of stations utilizing unscheduled power save delivery are in an awake state, the determining comprising
  - automatically deriving a wakeup schedule for the plurality of stations based on a frame arrival interval for each station, and
  - scheduling a response time for every station determined to be in the awake state, the scheduled response including a time when to respond and a duration of time allocated for the response; and
- sending an aggregate frame, the aggregate frame comprising at least one frame for each of the plurality of stations in the awake state;
- wherein the time allocated for the response for every station is based on a calculation of number of uplink frames waiting to be sent; and
- wherein the calculation of number of uplink frames waiting to be sent is based the frame arrival interval and an amount of time since a last uplink frame was received.

15. A method according to claim 14, wherein the predetermined interval for each station is an interval from when a last frame was received from the station.

16. A method according to claim 14, wherein the determining comprises receiving a frame from at least one station in the awake state.

17. A method according to claim 14, further comprising waiting until receiving a packet from every one of the plurality of stations in the awake state before sending the aggregate frame.

18. An access point, comprising:
- a wireless transceiver;
- a controller coupled to the wireless transceiver for controlling the operation thereof;
- a scheduler coupled to the controller configured to determine a predetermined interval that a plurality of stations utilizing unscheduled power save delivery are in an awake state, and to create an aggregate frame, the aggregate frame comprising at least one frame for each of the plurality of stations in the awake state, wherein the scheduler is configured for automatically deriving a wakeup schedule for the plurality of stations based on a frame arrival interval for each station, and for scheduling a response time for every station determined to be in the awake state, the scheduled response including a time when to respond and a duration of time allocated for the response;
- wherein the time allocated for the response for every station is based on a calculation of number of uplink frames waiting to be sent;
- wherein the calculation of number of uplink frames waiting to be sent is based the frame arrival interval and an amount of time since a last uplink frame was received; and
- wherein the controller is responsive to the scheduler creating the aggregate frame to send the aggregate frame to the wireless transceiver for transmission.

19. An access point according to claim 18, wherein the predetermined interval for each station is an interval from when a last frame was received from the station.

20. An access point according to claim 18, wherein the scheduler determines at least one station is in the awake state after receiving a frame from the at least one station.

21. An access point according to claim 18, the scheduler is further configured to wait until receiving a packet from every one of the plurality of stations in the awake state before sending the aggregate frame.

* * * * *